United States Patent [19]

Hamanaka et al.

[11] Patent Number: 5,013,500

[45] Date of Patent: May 7, 1991

[54] PROCESS FOR PRODUCING HOLLOW CERAMIC ARTICLES

[75] Inventors: Toshiyuki Hamanaka, Suzuka; Takashi Harada, Nagoya; Fumio Hattori, Ichinomiya, all of Japan

[73] Assignee: NGK Insulators, Ltd., Nagoya, Japan

[21] Appl. No.: 586,374

[22] Filed: Sep. 21, 1990

Related U.S. Application Data

[63] Continuation of Ser. No. 255,386, Oct. 11, 1988, abandoned.

[30] Foreign Application Priority Data

| | | | |
|---|---|---|---|
| Oct. 13, 1987 | [JP] | Japan | 62-257656 |
| Oct. 13, 1987 | [JP] | Japan | 62-257657 |
| Oct. 13, 1987 | [JP] | Japan | 62-257659 |
| Oct. 13, 1987 | [JP] | Japan | 62-257660 |
| Oct. 13, 1987 | [JP] | Japan | 62-257661 |

[51] Int. Cl.[5] .......... B28B 1/26; B28B 7/36; B28B 11/12; B29C 41/18

[52] U.S. Cl. .......... 264/40.4; 264/67; 264/86; 264/154; 264/219; 264/301; 264/302; 264/333; 264/338; 425/84

[58] Field of Search .......... 264/301, 303, 86, 87, 264/310, 311, 154, 333, 40.4, 40.1, 219, 338, 67; 425/147, 84, 85

[56] References Cited

U.S. PATENT DOCUMENTS

| | | | |
|---|---|---|---|
| 1,337,663 | 4/1920 | Lawrence . | |
| 1,630,762 | 5/1927 | Randall | 264/86 |
| 2,284,332 | 5/1942 | McCann | 425/147 |
| 2,569,869 | 10/1951 | Rempel | 264/86 |
| 2,583,842 | 1/1952 | Hendrickson | 264/40.4 |
| 2,962,790 | 12/1960 | Daniel | 264/86 X |
| 3,263,957 | 8/1966 | Lirones | 264/86 X |
| 3,383,444 | 5/1968 | Loyet | 264/87 |
| 3,392,221 | 7/1968 | Kindlespalker et al. | 264/86 X |
| 3,431,332 | 3/1969 | Cummings | 264/86 |
| 3,481,010 | 12/1969 | Colburn et al. | 264/86 X |
| 3,533,812 | 10/1970 | Cummings et al. | 264/86 X |

FOREIGN PATENT DOCUMENTS

| | | | |
|---|---|---|---|
| 0285312 | 10/1988 | European Pat. Off. . | |
| 2657177 | 6/1978 | Fed. Rep. of Germany . | |
| 3706208 | 10/1987 | Fed. Rep. of Germany . | |
| 517204 | 1/1940 | United Kingdom . | |
| 2088331 | 6/1982 | United Kingdom | 425/147 |
| 2124540 | 2/1984 | United Kingdom | 264/86 |

*Primary Examiner*—Jan H. Silbaugh
*Assistant Examiner*—Karen D. Kutach
*Attorney, Agent, or Firm*—Parkhurst, Wendel & Rossi

[57] ABSTRACT

Novel processes have been developed by the present invention for producing hollow ceramic articles. Such ceramic articles are produced by using a water-absorbable mold having water non-permeable faces on an inner surface of the mold at locations corresponding to valve holes. The thickness of a ceramic layer deposited on the inner surface of the mold is controlled by measuring an amount of a lowered liquid surface level of the slurry near a slurry-pouring opening of the mold. Open ends of a hollow ceramic article are formed by cutting corresponding closed ends after deposition of the slurry and firing. A uniform thickness of a slurry deposited onto the inner surface of the mold can be attained by rotating the mold around an arbitrary rotary axis at a rotation speed of 1 to 60 rpm. All ceramic material contained in the slurry fed inside the mold may be deposited on the inner surface of the mold while the mold is being rotated or swung.

8 Claims, 12 Drawing Sheets

PROCESS FOR PRODUCING HOLLOW CERAMIC ARTICLES

This is a continuation of application Ser. No. 07/255,386, filed Oct. 11, 1988, now abandoned.

BACKGROUND OF THE INVENTION (1) Field of the Invention

The present invention relates to a process for producing hollow ceramic articles. More particularly, the invention relates to a process for producing hollow ceramic articles, such as ceramic port liners to be used for lining inner surfaces of exhaust ports for gasoline engines, diesel engines and the like, by drain or slip casting.

(2) Related Art Statement

It is already known that purifying performances of a catalyst are improved and turbo lag of a turbocharger is reduced by increasing temperatures of exhaust gases due to a heat insulating effect of a ceramic material lining the inner surface of an exhaust port in the form of a port liner. Such techniques are considered to be effective particularly for four valve type engines which are likely to reduce temperatures of exhaust gases. Such ceramic port liners may be shaped by a drain casting, in which a ceramic slurry is poured inside a water-absorbable mold made of gypsum or the like and an excess amount of the slurry is drained after a slurry material is deposited on the inner surface of the mold (For example, see "Ceramic Engineering Handbook" published by Gihoudo Co., Ltd. Dec. 25, 1966, pp. 1152–1159). However, in case of port liners, valve holes need to be bored at specific locations. Formerly, such valve holes are formed by mechanical working using a drill or the like after the shaping or firing. However, since a surface of the port liner to be worked is a curved surface, many shortcomings are pointed out that the working takes much time, that locating is difficult, that accurate working needs a great number of steps, and that cracks are likely to be formed due to brittleness of the ceramics even after the firing.

Further, although hollow ceramic articles having complicated configurations are generally shaped by drain casting which comprises the steps of pouring a slip inside a water-absorbable mold and draining the slip from the mold after a given time passes, the thickness of a deposited ceramic is adjusted by controlling a time period from a slurry pouring to a slurry drainage. Thus, when such hollow ceramic articles are to be mass-produced by using a number of molds, the deposition thickness is not kept constant due to variations in use history of the molds (gypsum molds), variations in water-absorbability due to changes in mold temperatures, and changes in viscosity and temperature of the slurry. Consequently, at the present time the thickness can be controlled only in the order of mm. Therefore, such a drain casting can be applied only to articles, such as novelties and sanitary wares, which do not require accurate thickness control.

Recently, ceramic port liners have been investigated to line inner surfaces of exhaust ports for automobile engines, and slip casting has attracted attention as a shaping process therefor. However, since the thickness of the ceramic port liner influences heat insulating properties and engine output, the thickness must strictly be controlled to not more than 0.1 mm. Such a requirement could not be satisfied by the conventional techniques at all.

For example, as shown in FIG. 9, a ceramic port liner has opening ends 14 and 15 on an engine side and an exhaust pipe side, respectively. Such a ceramic port liner is ordinarily shaped by drain casting as mentioned above. However, since aluminum titanate or the like usually employed as a material for the port liner has a great firing shrinkage factor, the shapes of the opening ends 14 and 15 are unfavorably likely to distort during firing. As shown in FIG. 9, since the four valve engine port liner has a particularly complicated configuration with two opening ends 14 on the engine side, these opening ends 14 are likely to distort. Further, firing shrinkage of the opening end 15 which contacts a setter during firing is restrained due to the self weight of the ceramic to cause distortion.

Further, when hollow ceramic articles are to be produced by drain casting, this technique has the shortcomings that if the grain size of a ceramic raw material in a slurry is great, or if the specific gravity of the raw material is large, or if the viscosity of the slurry is low, the raw material precipitates during deposition such that differences in deposited thickness occur between upper and lower portions of a shaped body. Thus, the raw material cannot be used after it is adjusted as a slurry suitable for casting by grinding and screening it.

SUMMARY OF THE INVENTION

It is the object of the present invention to overcome the above-mentioned problems.

More particularly, an object of the present invention is to provide a process for easily producing hollow ceramic articles, such as ceramic port liners, with accurately formed valve holes by drain slip coating.

Another object of the present invention is to provide a process for shaping hollow ceramic articles having complicated shapes, such as ceramic port liners, by slip casting, with high accuracy in thickness.

Still another object of the present invention is to provide a process for producing hollow ceramic articles, such as ceramic port liners, having given shapes while assuredly preventing distortion of open ends of the ceramic port liners during firing.

A further object of the present invention is to provide a process for hollow ceramic articles by slip casting, which enables deposition of a slurry in a uniform thickness even when the slurry is composed of a raw material having a greater specific gravity or of a coarse raw material.

A still further object of the present invention is to provide a process for producing hollow ceramic articles having complicated shapes, such as ceramic port liners or ceramic manifolds (with high accuracy in thickness) by slip casting. The process yields a deposition of uniform thickness even when using a slurry composed of a raw material having a great specific gravity or coarse grain size.

According to the first aspect of the present invention, there is a provision of the process for producing hollow ceramic articles, such as port liners, with holes bored corresponding to valve holes. The steps of this process are comprised of pouring a ceramic slurry inside a water-absorbable mold in which water non-permeable faces are provided on an inner surface of the port liner at locations corresponding to valve holes, and depositing a slurry material to the inner surface in a given thickness excluding the water non-permeable faces.

According to a second aspect of the present invention, there is a provision of a process for producing hollow ceramic articles, which process comprises the steps of feeding a given amount of a slurry inside a water-absorbable mold, measuring a lowered surface level of the slurry near a slurry-pouring opening of the mold, and draining the remaining slurry from inside the mold when a measured lowered level reaches a preset value.

According to a third aspect of the present invention, there is a provision of a process for producing ceramic port liners, which process comprises the steps of shaping a port liner body with ends on an engine side and on an exhaust pipe side being each closed in the form of an end-closed bag, and opening the ends by cutting after firing.

According to a fourth aspect of the present invention, there is a provision of a process for producing hollow ceramic articles by slip casting, which comprises the steps of pouring a slurry inside a water-absorbable mold and depositing the slurry while rotating the mold around an arbitrary rotary axis at a number of revolutions from 1 to 60 rpm.

According to a fifth aspect of the present invention, there is a provision of a process for producing hollow ceramic articles by slip casting, which comprises the steps of feeding a slurry inside a water-absorbable mold in a given amount necessary for an intended deposition thickness, and depositing substantially all the fed slurry on the inner surface of the mold while the mold is being rotated or swung.

These and other objects, features and advantages of the invention will be appreciated upon reading of the invention when taken in conjunction with the attached drawings, with the understanding that some modifications, changes and variations of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein.

DETAILED DESCRIPTION OF THE INVENTION

The present invention will be explained in more detail with reference to the attached drawings.

Figure 1:
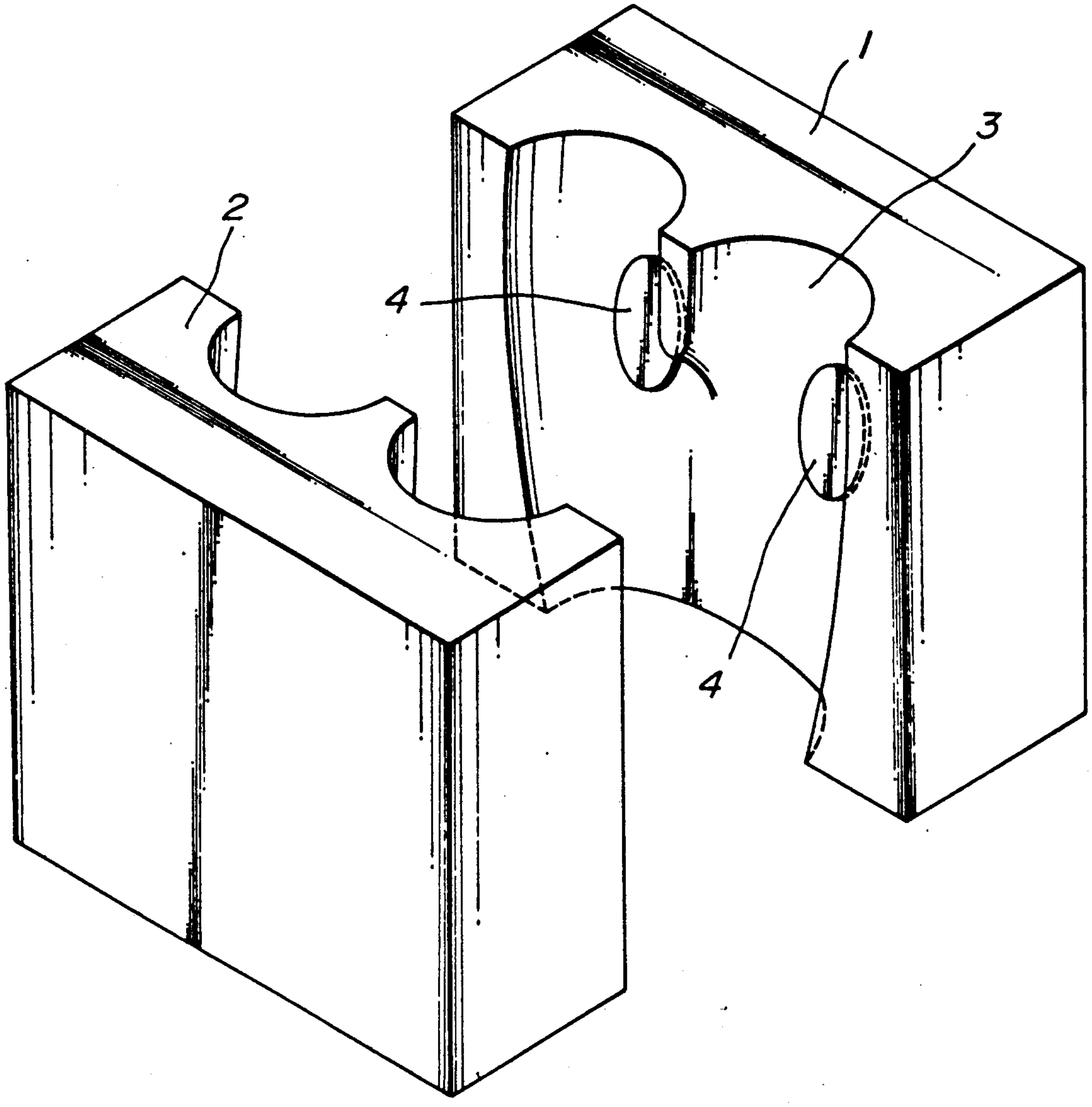
FIG. 1 is a perspective view of a split type mold to be used in the first aspect of the present invention.

In FIG. 1 are shown water-absorbable mold sections 1 and 2 to be used for effecting the first aspect of the present invention. As the mold, a gypsum mold is ordinarily used. But, a water-absorbable resin mold may be used. Water non-permeable faces 4 are formed on the inner surface 3 of the mold section 1 at locations corresponding to valve holes. The water non-permeable face 4 has a shape corresponding to that of the valve hole. The water non-permeable face is formed by an arbitrary method, such as, by attaching a water non-permeable seal, applying a water non-permeable resin, or burying a water non-permeable resin.

Figure 2:
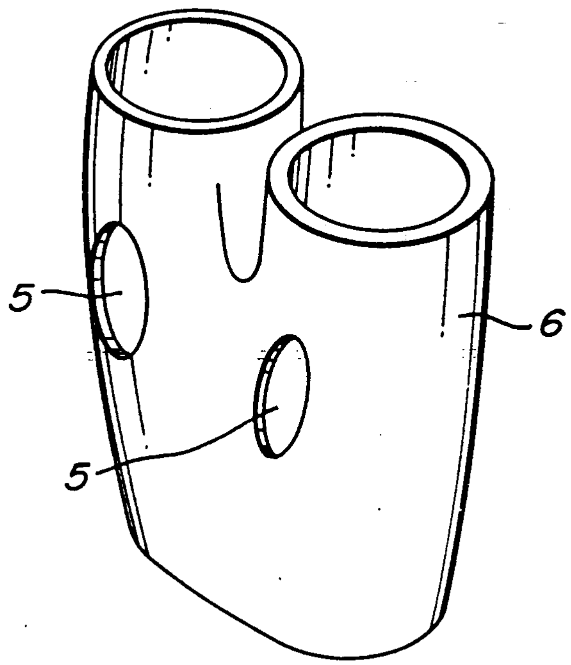
FIG. 2 is a perspective view of a ceramic port liner obtained by the first aspect of the present invention.

After the water-absorbable mold sections 1 and 2 are shut, a ceramic slurry is poured inside the mold. Although the ceramic slurry is not limited to any particular one, use of aluminum titanate based ceramic is preferred. This is because this material has heat resistance and a modulus of elasticity suitable for port liners. Water contained in a portion of the poured ceramic slurry which contacts the inner walls of the water-absorbable mold sections 1 and 2 is absorbed thereinto, and a slurry material is gradually deposited inside the mold sections 1 and 2. Since the water non-permeable faces 4 have no such water-absorbing effect, no slurry material is deposited thereon at all. Thus, after the slurry material deposits on the inner surfaces of the mold sections excluding the water non-permeable surfaces 4 in a desired thickness, the remaining slurry is drained. By opening the mold sections 1 and 2, a ceramic port liner 6 having holes corresponding to valve holes 5 as shown in FIG. 2 can be obtained.

In the thus obtained ceramic port liner 6, peripheral edges of the holes have only to be slightly corrected, and the number of working steps can greatly be reduced as compared with a conventional process where valve holes are bored in a blank ceramic port liner body by mechanical working. Further, the port liner can be prevented from being cracked during the mechanical working.

In addition, according to the process of the first aspect of the present invention, the valve holes can be preliminarily formed in accurate locations without need to locate valve holes 5 by mechanical working. Moreover, the valve holes 5 may freely be formed in any curved surface. In addition, the dimensional accuracy of the valve holes 5 can be attained with extremely high accuracy by adjusting the size of the water non-permeable face 4.

As is clear from the aforegoing explanation, according to the present invention, the ceramic port liner having the valve holes accurately formed can easily be produced by a simple technique that the water non-permeable faces are formed in the inner surface of the water-absorbable mold corresponding to the valve holes. Thus, the present invention greatly contributes to industrial developments as this process for producing ceramic port liners eliminates conventional problems.

FIGS. 3 through 6 illustrate the second aspect of the present invention. Reference numerals 7 and 8 denote a split type mold made of a water-absorbable material, such as a gypsum mold or a water-absorbable resin mold, and a liquid level meter attached to a slurry-pouring opening of the mold, respectively. First, a given amount of a slurry 9 is poured inside the mold 7, and a liquid surface level at that time is measured by the liquid level meter 8. Next, when the slurry 9 is maintained inside the mold as it is after the pouring is stopped, a slurry material is gradually deposited on the inner surface of the mold 7 while water in a portion of the slurry 9 contacting the inner surface of the water-absorbable mold 7 is gradually absorbed into the mold 7. Correspondingly, the liquid level of the slurry 9 near the slurry-pouring opening gradually lowers. The lowered liquid surface level (cc) is measured by the liquid level meter 8. When a measured lowered liquid surface level reaches a preset value, the mold 7 is inverted to drain the slurry 9. In this case, it is preferable to apply a water non-permeable resin or paint to a portion of the inner surface of the mold at which the lowered liquid surface level is to be measured (see FIG. 5).

Figure 3:
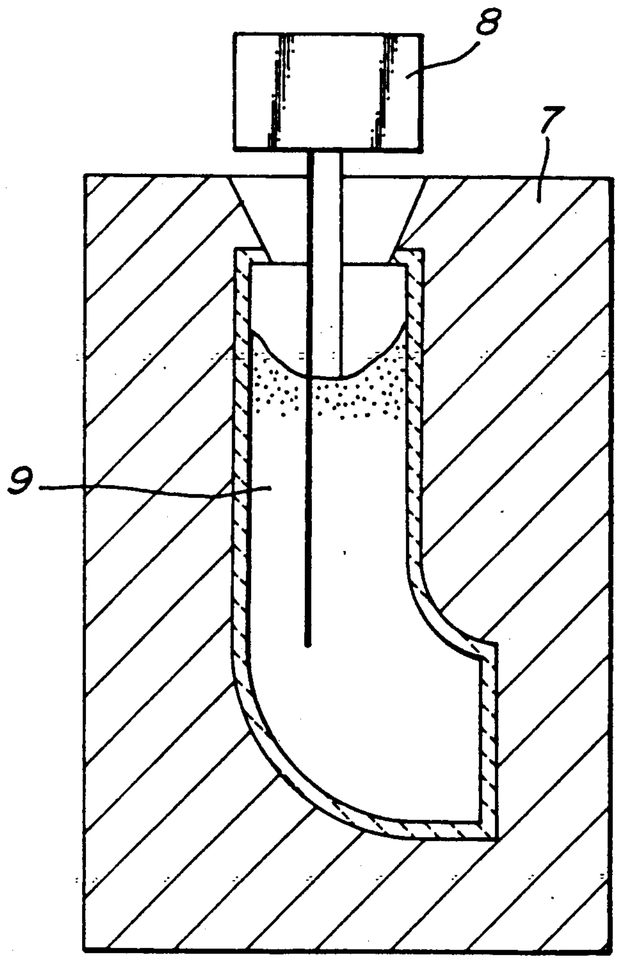
FIG. 3 is a schematically sectional view illustrating the process according to the second aspect of the present invention.
Figure 4:
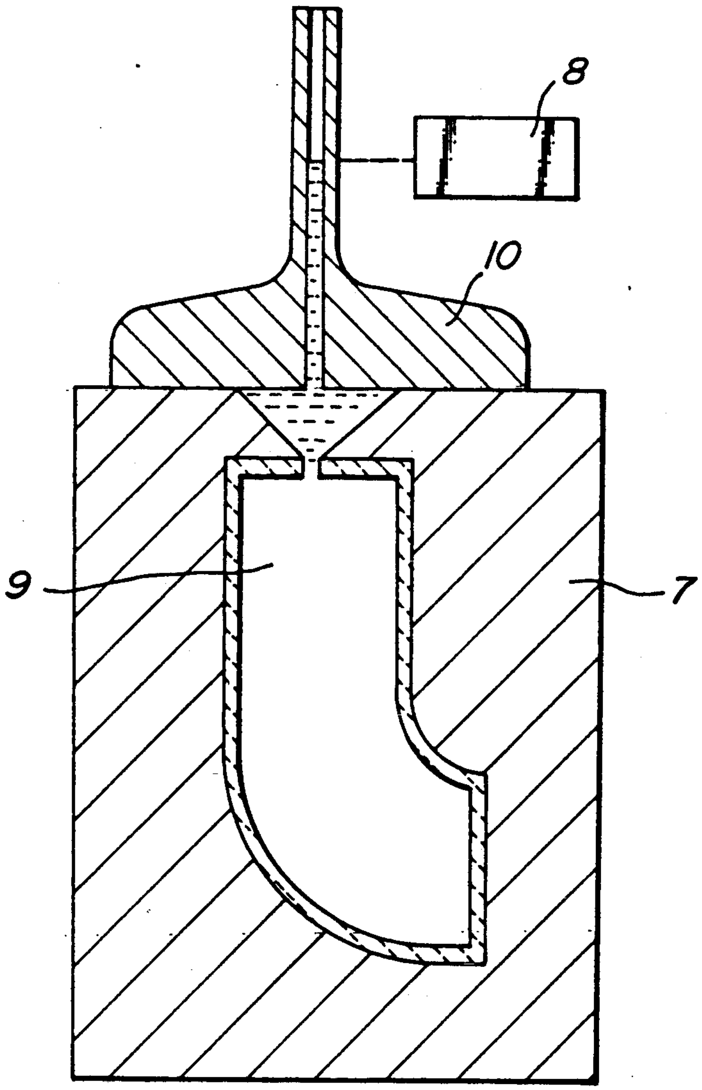
FIGS. 4 and 5 are schematically sectional views illustrating modifications of FIG. 3.
Figure 5:
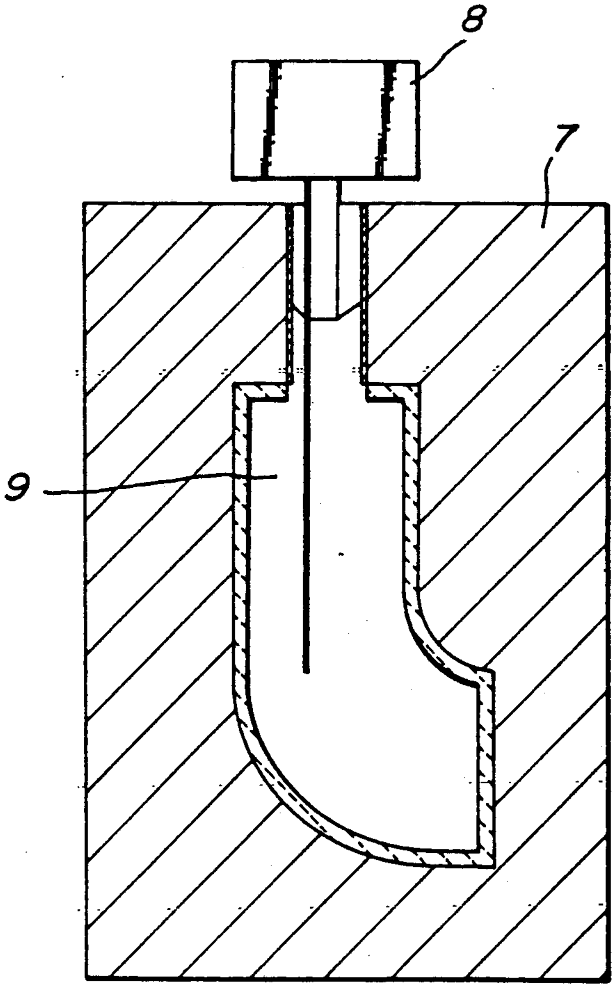

As mentioned above, it is indispensable to measure the lowered liquid surface level in the present invention. The liquid level meter 8 may be of an electrically conductive type as shown in FIG. 3, or a type in FIG. 10 in which a transparent cover 4 is intimately set on the upper end of the mold 7 and a liquid level in a pipe portion of the cover is measured by an optical liquid level meter 8.

It is preferable that the mold has such a shape that the inner diameter of the slurry-pouring opening is throttled to enable accurate measurement of the lowered liquid surface level.

It was confirmed from the following example that there is a linear correlation between the lowered liquid surface level and the deposited thickness.

EXAMPLE 1

A volume-calibrated transparent pipe was set at a slurry-pouring opening of a gypsum mold having an inner volume of 350 cc for shaping port liners. A slurry having the viscosity of 0.5 p was prepared by adding a polycarbonic acid based deflocculant and an acrylic resin based binder to aluminum titanate and further adding 19% by weight of water thereto, and the slurry temperature was adjusted to 22° C. Then, the slurry was filled in the mold. The relationship between the lowered liquid surface level and the deposited thickness was investigated, and it was recognized as shown by black circles in FIG. 6 that there is a substantially linear correlation between them. Since the inner surface area of the mold 7 decreases as the deposition proceeds, the depositing speed tends to gradually increase per unit lowered liquid surface level.

Figure 6:
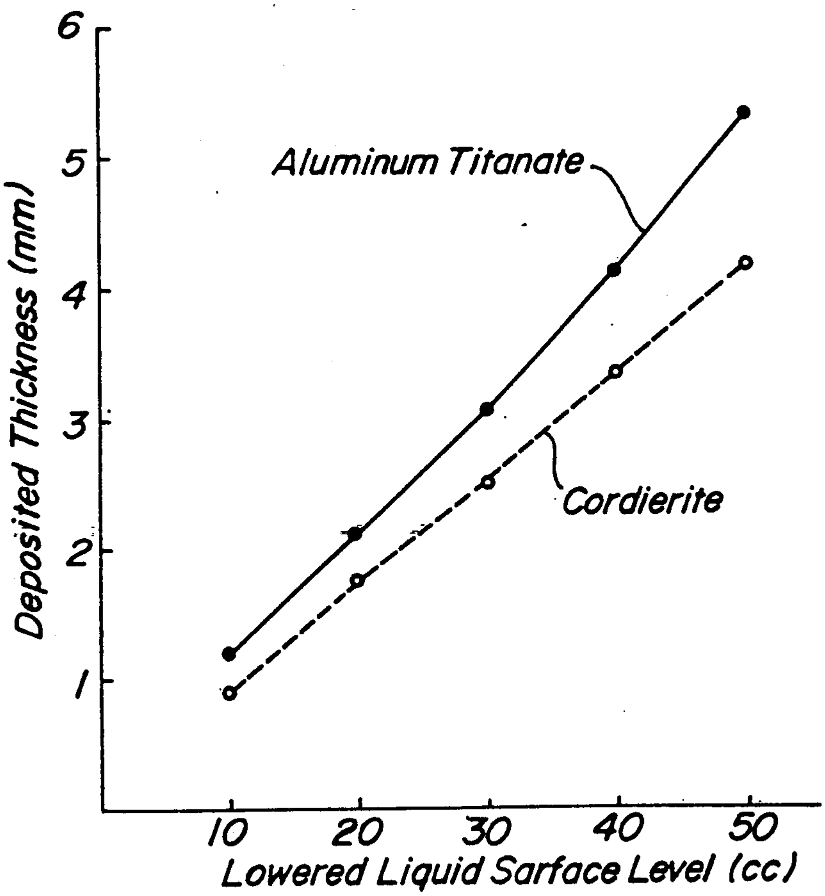
FIG. 6 is a graph showing the relationship between a lowered liquid surface level and a deposited thickness.

Aluminum titanate as the raw material of the slurry was replaced by cordierite, and water was increased to 22%. In that case, the relationship between the lowered liquid surface level and the deposited thickness was also examined. As shown in FIG. 6 by white circles, a linear correlation was also recognized. When the raw material was replaced by 100% alumina or 100% zirconia, a linear correlation was recognized, too. Therefore, if the slurry is drained from the inside of the mold when the lowered liquid surface level reaches a preset value, the deposited thickness can accurately be controlled.

As is clear from the aforegoing explanation, according to the present invention, ceramic articles having complicated shapes, such as ceramic port liners, can be shaped with high accuracy in thickness by slip casting. Thus, the present invention is advantageously suitable for mass production without being influenced by the changes in the water absorbability due to variations in use history of the molds and mold temperatures. Thus, the present invention greatly contributes to industrial developments as a technique for eliminating the problems of conventional techniques.

Figure 7:
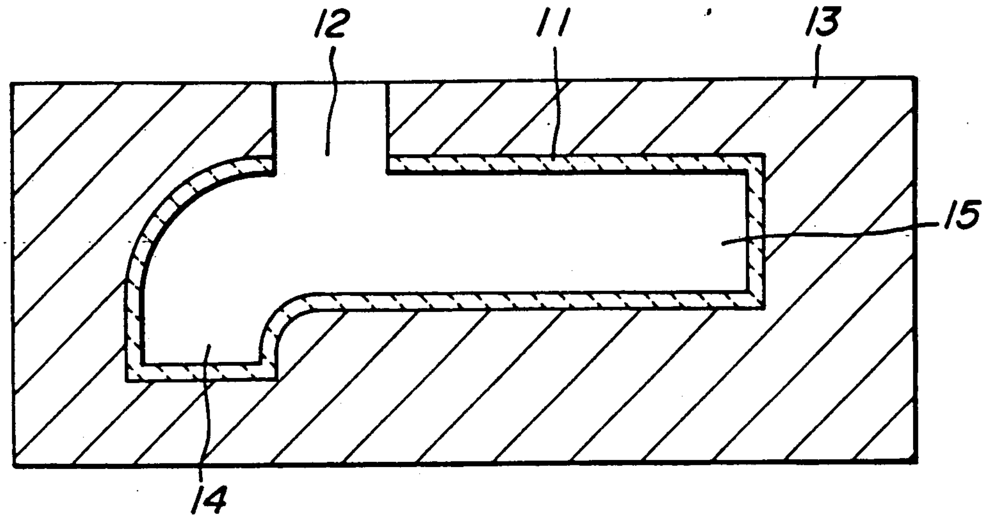
FIG. 7 is a sectional view illustrating the process according to the third aspect of the present invention.
Figure 8:
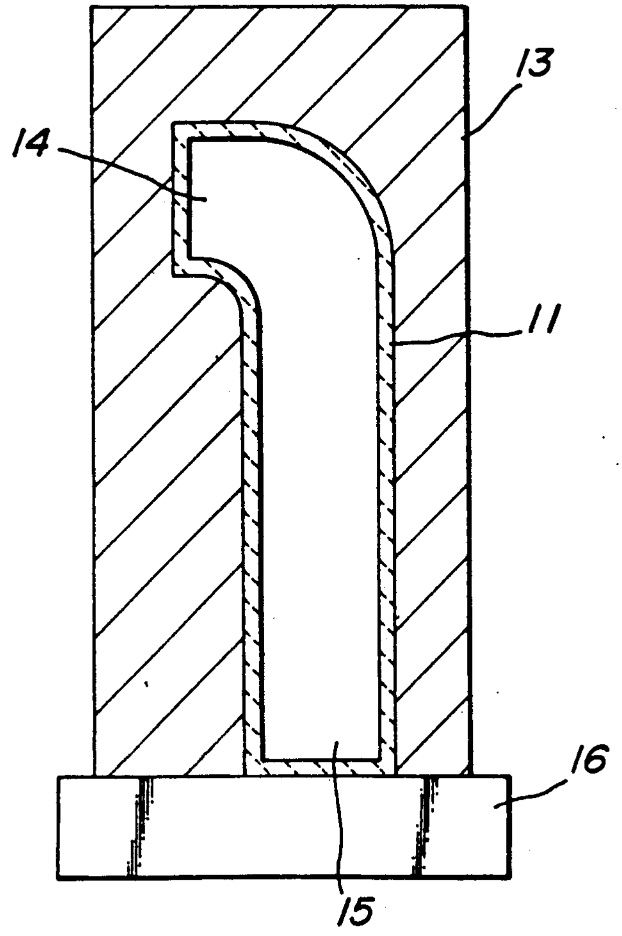
FIG. 8 is a sectional view illustrating a modification of the process in FIG. 7.
Figure 9:
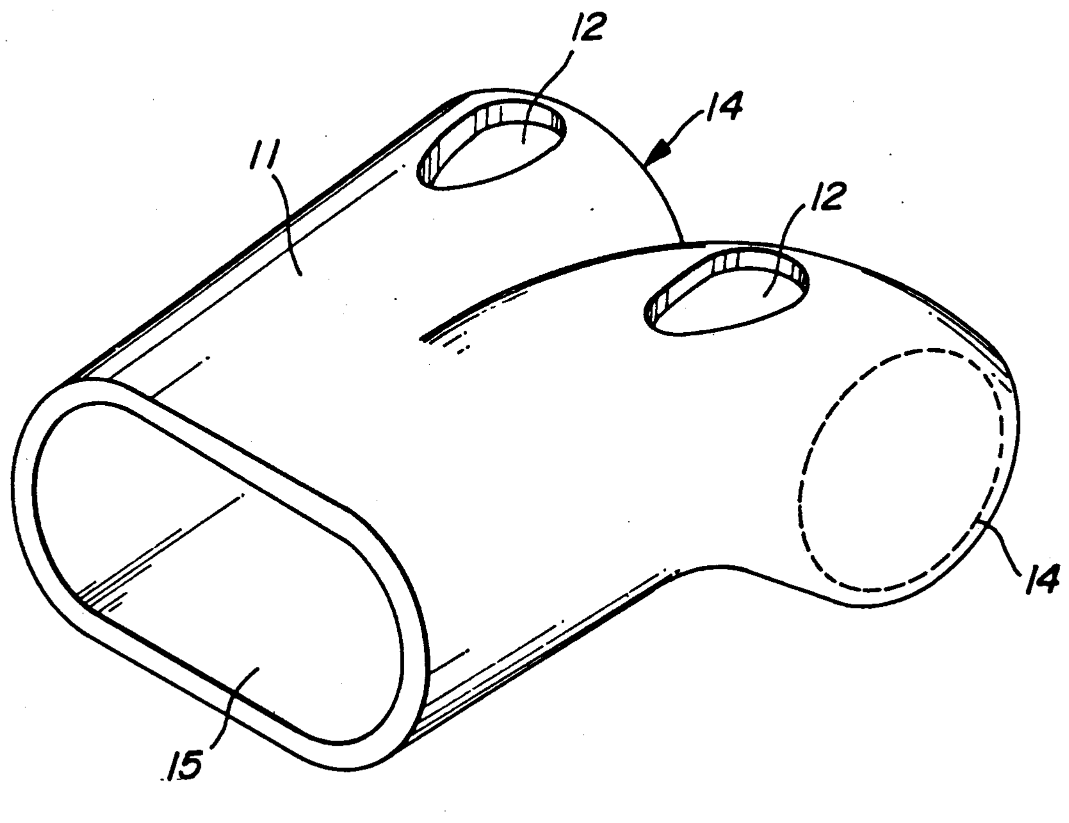
FIG. 9 is a perspective view of a ceramic port liner obtained by the third aspect of the present invention.

FIGS. 7 through 9 show the third aspect of the present invention.

First, a port liner body 11 is shaped by drain casting. The port liner body 11 has ends 14 and 15 on engine side and on an exhaust pipe side each closed in a bag-like fashion. For this purpose, a split type mold 13 is used. As shown in FIG. 7, the mold 13 has a cavity which is opened outside at a valve hole 12 only, and its opposite ends are closed. A slurry of a ceramic such as aluminum titanate is poured through the valve hole 12. After the pouring, water is absorbed through the mold 13, and the ceramic is gradually deposited on the inner surface of the mold. When the deposited thickness reaches a given value, excess slurry is discharged through the valve hole 12. Then, a port liner body 11 having opposite ends closed in the bag-like fashion as shown in FIG. 7 can be obtained. If an air escape hole is formed at the ends closed in the bag-like fashion, the slurry can be spread all over the cavity of the corners of the mold 13. Thus, demolding becomes easier.

As shown in FIG. 8, by using a mold 13 with an open end 15 on an exhaust pipe side, slip casting is effected according to an ordinary process. Then, a water-absorbable plate 16 is butted to the open end 15 of the mold 13, and the whole mold is vertically inversed. A part of the remaining slurry is fixed at the open end 15 by means of the water-absorbable plate 16. After the port liner body 11 having the ends 14 and 15 closed in the bag-like fashion is thus shaped, and then removed from the mold 13, it is fired. Although the entire whole shaped body cannot be prevented from shrinkage due to firing at that time, distorting of the ends 14 and 15 can be restrained to an extremely low degree as compared with the ends being opened, since the ends are closed in the bag-like fashion. When the ends are each left in such a closed shape, uneven shrinkage of the open end 15 butting a setter during firing can be prevented, thereby minimizing the distortion. When the closed open ends are cut off after the firing, the ceramic port liner having the open ends 14 and 15 free from distortion can be obtained.

As is clear from the aforegoing explanation, the present invention has succeeded in obtaining the ceramic port liners having open end portions free from distortion by shaping port liner bodies having ends closed in the bag-like fashion, and cutting of these ends after the firing. Thus, the present invention greatly contributes to industrial developments as this process for producing this ceramic port liners eliminates the problems possessed by the prior art.

Figure 10:
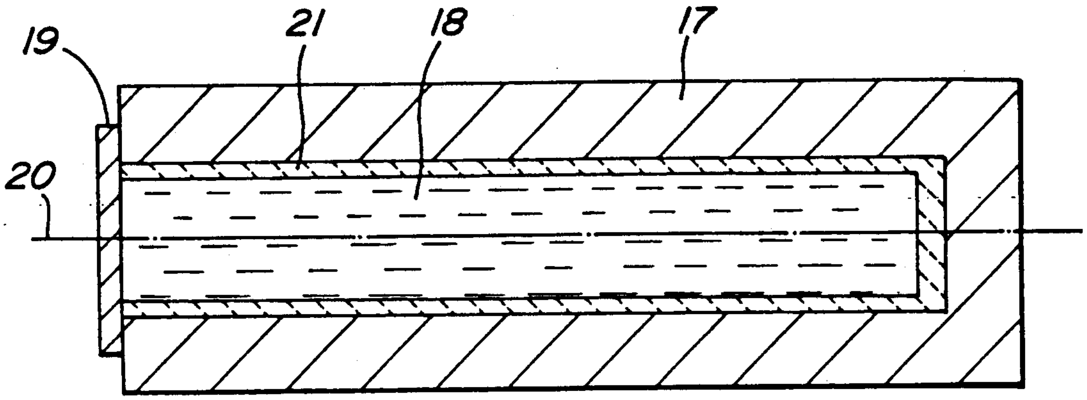
FIG. 10 is a schematically sectional view illustrating the process according to the fourth aspect of the present invention.
Figure 11:
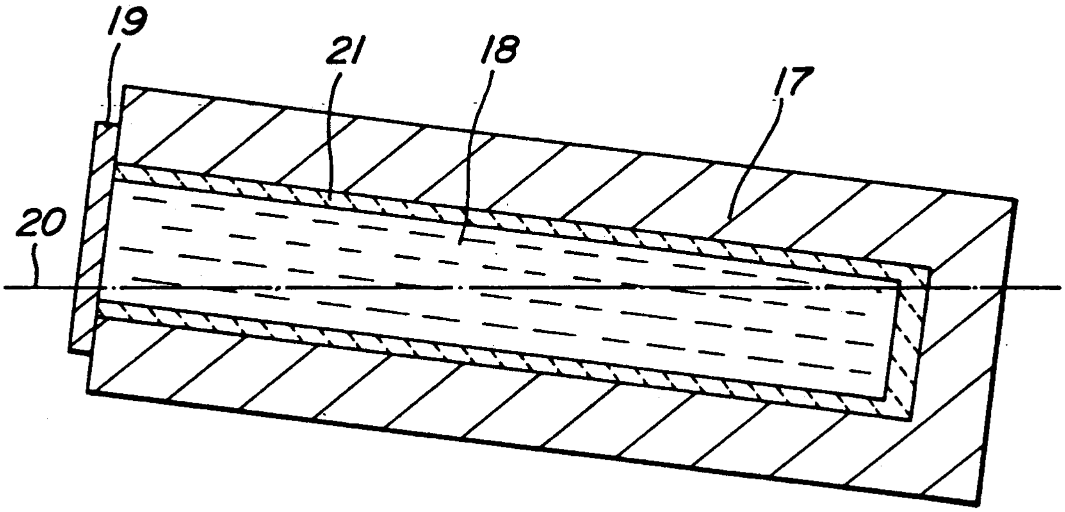
FIG. 11 is a schematically sectional view illustrating a modification of the process in FIG. 10.
Figure 12:
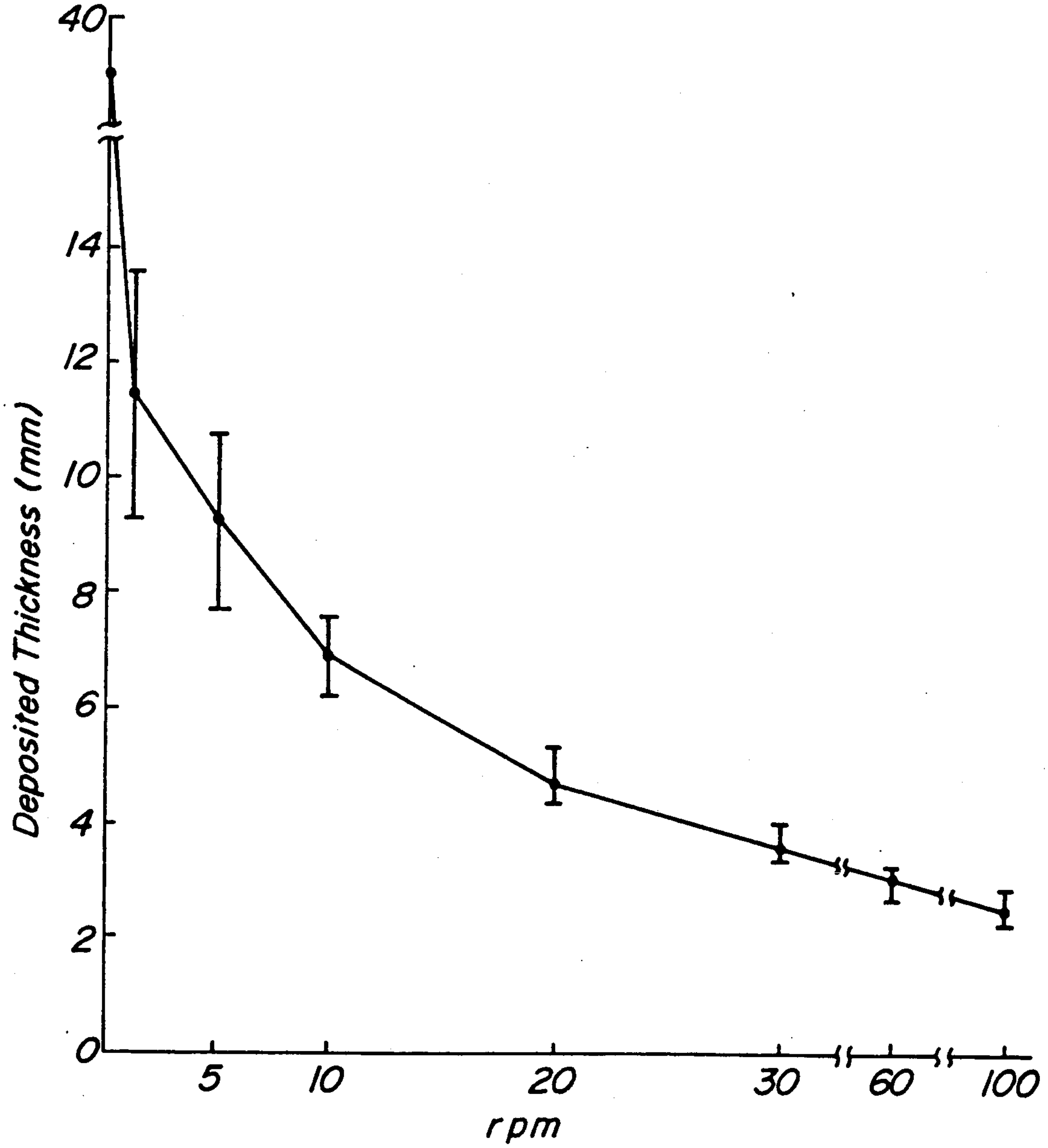
FIG. 12 is a graph showing the relationship between the number of revolutions and the deposited thickness.

FIGS. 10 through 12 illustrate the fourth aspect of the present invention.

In FIG. 10, a reference numeral 17 denotes a split type mold made of an arbitrary water-absorbing material, such as a gypsum mold or a water-absorbable resin mold. A slurry 18 is fed inside the mold 17 in an erected posture according to an ordinary manner. Then, an opening of the mold 17 is sealed with a seal plate 19 made of an appropriate material such as rubber, and is slowly rotated around any rotary axis 20 of the mold 17 at a rotary speed from 1 to 60 rpm. The rotary axis 20 may be horizontal or inclined as shown in FIG. 11. However, when the mold 17 is long it is preferable that the mold 17 is laid down, and rotated around a horizontal rotary axis. During the rotation, raw material in the slurry continuously varies its precipitating direction, so that the raw material is uniformly deposited upon the entire inner surface of the mold 17. If the rotary speed is less than 1 rpm, variations in the thickness of the deposited layer 21 increases, while if it is more than 60 rpm, particles of the raw material cause layer separation. The layer separation means that having particles move outside (toward the inner surface of the mold) due to centrifugal forces will cause ununiformity in the grain size inside the deposited layer 21 in the thickness direction. Such a phenomenon is commonly observed in the centrifugal slip casting in which deposition is effected while the mold is rotated at extremely high speeds to promote the deposition by utilizing centrifugal forces.

The present invention enables uniform deposition without causing any layer separation. For this purpose, the number of revolutions is limited to a range 1 to 60 rpm. It may be that while the mold 17 is rotated around a certain rotary axis 20, the mold may be swung according to a known swinging technique. Furthermore, it is preferable that the mold has a cylindrical outer shape, because the mold is rotated. However, the shape of intended hollow ceramic articles is not limited to cylindrical shapes, but includes complicated shapes.

According to the present invention a uniform deposition can be effected even when the grain size of the raw material in the slurry is large, when the specific gravity of the raw material in the slurry is great, or when the specific gravity of the raw material is large. This will be made clear from the following example:

EXAMPLE 2

A slurry was poured inside a cylindrical gypsum mold having an inner diameter of 30 mm and a height of 150 mm up to an upper end thereof. The slurry contained as raw materials: crystallized glass having a great depositing speed and being ground to an average particle diameter of 18 μm, a polycarbonic acid-based deflocculant, and an acrylic resin based binder, and was adjusted to a viscosity of 6.2 p and a water content of 26%. The slurry-containing mold was set on a rotary table, and rotated at various speeds from 0 to 100 rpm for one minute. Then, a shaped body was removed from the mold, and dried. The thickness of the shaped body was measured at points A, B and C spaced from 30 mm, 75 mm and 120 mm from the upper end, respectively, and a center (D) at the bottom, and the layer separation was checked. Results are shown in the following Table 1, and are plotted in FIG. 12.

TABLE 1

| | Conventional Example | Example | | | | | | Comparative Example |
|---|---|---|---|---|---|---|---|---|
| Number of revolution rpm | 0 | 1 rpm | 5 rpm | 10 rpm | 20 rpm | 30 rpm | 60 rpm | 100 rpm |
| Deposited thickness (mm) | | | | | | | | |
| A | 10.3 | 9.3 | 9.0 | 6.2 | 4.4 | 3.4 | 2.8 | 2.3 |
| B | 13.4 | 10.6 | 7.7 | 6.7 | 4.7 | 3.5 | 3.1 | 2.4 |
| C | 15.8 | 12.5 | 9.7 | 7.1 | 4.5 | 3.5 | 3.0 | 2.5 |
| D | 116.8 | 13.6 | 10.8 | 7.6 | 5.4 | 4.1 | 3.3 | 2.9 |
| Average | 39.0 | 11.5 | 9.3 | 6.9 | 4.8 | 3.6 | 3.1 | 2.5 |
| Variation | 106.5 | 4.3 | 3.1 | 1.4 | 1.0 | 0.7 | 0.5 | 0.6 |
| Layer separation | no | no | no | no | no | no | slightly occurred | occurred |

As is clear from the foregoing explanation, according to the present invention, even when the raw material which is likely to locally deposit is used, variations in the deposited thickness inside the mold can be restrained to an extremely low level without being accompanied by the layer separation. Thus, uniform deposition can be effected.

As mentioned above, according to the present invention, even when the slurry containing the great specific gravity raw material or coarse raw material (which is likely to cause variations in the deposited thickness) is used, the raw material can uniformly be deposited upon the entire inner surface of the mold. Thus, great effects can be obtained even in the case of specific raw materials or long products. Therefore, the present invention greatly contributes to industrial developments as a means of producing hollow ceramic articles by the slip casting process and eliminating the problems possessed by the prior art.

Figure 13:
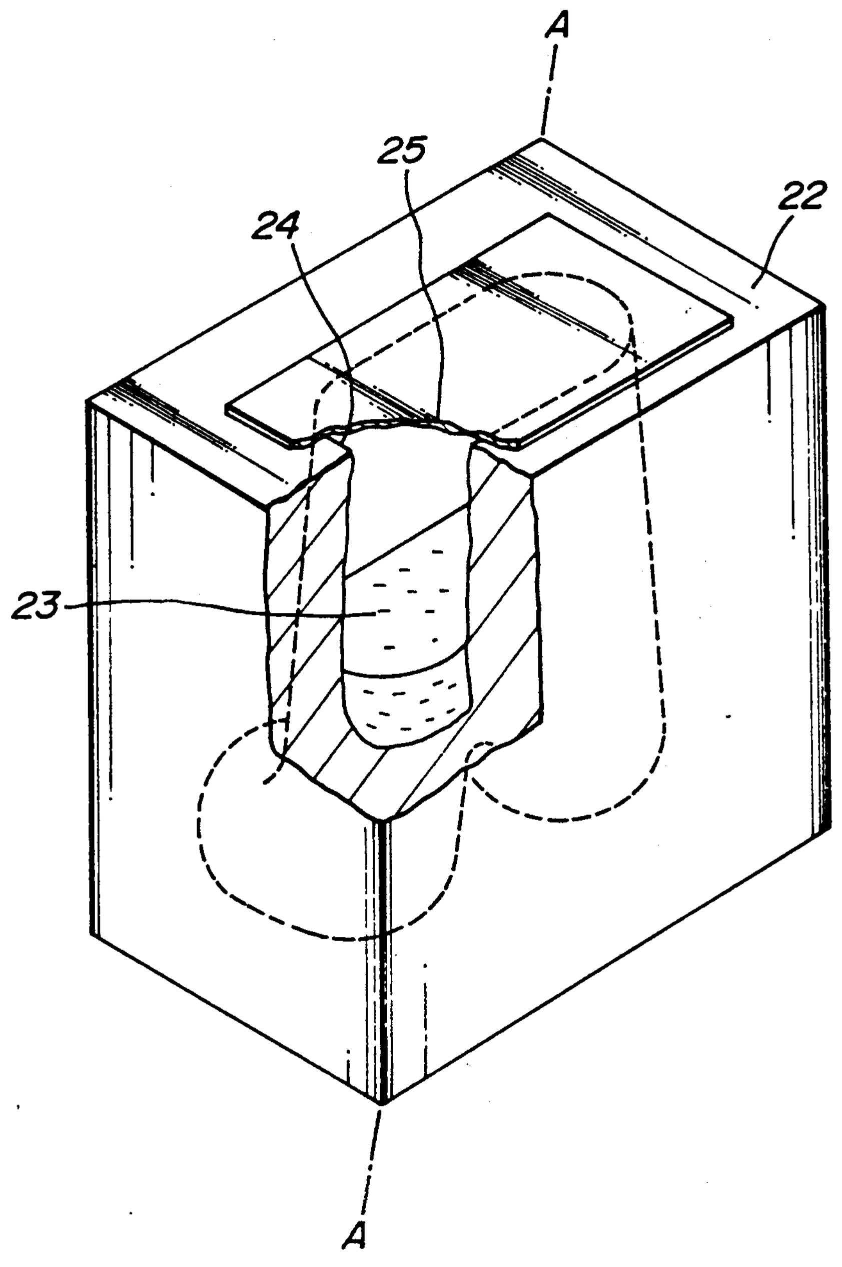
FIG. 13 is a partially cutaway perspective view of the process according to the present invention.
Figure 14:
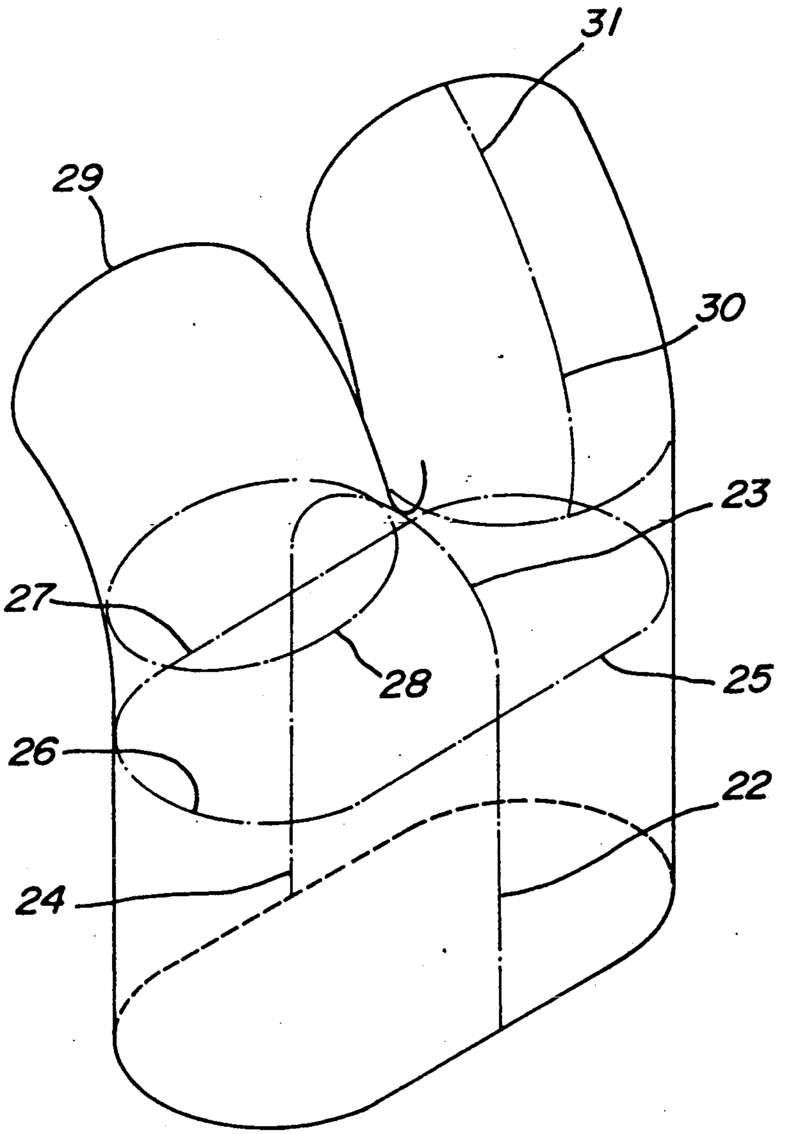
FIG. 14 is a perspective view of illustrating locations of an example at which the thickness is measured.

FIGS. 13 and 14 show the fifth aspect of the present invention.

First, a slurry 23 is poured inside a mold 22 made of a water-absorbable material, such as a gypsum mold or a water-absorbable resin mold, in an amount necessary for giving an intended deposited thickness. In the ordinary drain casting, the slurry is fed inside the mold 22 in an excess amount to promote the deposition. Thus, the present invention differs from the conventional process in that only a necessary amount of the slurry is fed inside the mold. Next, a slurry-pouring opening 24 of the mold 22 is sealed with a sealing plate 25 made of an appropriate material, and the mold 22 is continuously rotated or swung around, for instance, an inclined diagonal axis A—A shown at a low speed from about 1 to 60 rpm. During the rotation or swinging, the slurry 23 is gradually deposited upon the inner surface of the mold 22. At that time, since the mold 22 is also vertically rotated or swung, the raw material contained in the slurry uniformly deposits without being sedimented. It is possible to select any arbitrary rotary axis depending upon the shape of the mold and ceramic articles to be shaped. In case that the outer shape of the mold is cylindrical, with a center line as the rotary axis, it is favorable to use a rotary table.

If the rotary speed is less than 1 rpm, variations in the thickness of a deposited layer increase, while if it is more than 60 rpm, particles having greater specific gravity move outside due to centrifugal forces. Consequently, a phenomenon called "layer separation" that non-uniformity of the grain size occurs inside the deposited layer in the thickness direction unfavorably occurs.

According to the present invention, the mold continues to be rotated until substantially all the amount of the raw materials in the slurry fed inside the mold 22 deposits on the inner surface thereof. Therefore, the thickness of the deposited layer is determined by the amount of the slurry fed to the mold 22. Contrary to the conventional technique, excess or deficient deposition will not occur in the present invention. Thus, the deposited thickness can accurately be adjusted by controlling the weight of the solid content in the slurry.

In order to prevent foaming of the slurry 23 during the rotation or swinging, a defoaming agent such as a surface active agent may be added. Alternatively, it may be that a pipe is buried inside the mold 22, and the mold is sucked in vacuum through the pipe to promote the deposition. Furthermore, the mold may be externally heated at such a temperature which will cause no adverse affects upon the mold, for instance, at temperatures not more than 70° C. in the case of the gypsum mold, thereby promoting drying and packing the deposited layer. However, in this case, in order to ensure the uniformity of the deposited layer, it is preferable to use a slurry exhibiting a depositing speed of not more than 0.5 mm/min.

EXAMPLE 3

Two hundred grams of a slurry mainly composed of aluminum titanate were fed to a mold made of gypsum for shaping port liners of automobile engines. The slurry had a content of 21% of water and a viscosity of 0.5 p. A slurry-pouring opening of the mold was sealed with a rubber seal plate, and the mold was continuously rotated around a diagonal axis thereof at 20 rpm for 30 minutes, thereby depositing the entire content of the slurry material upon the inner surface of the mold. Then, after the rotation was stopped, a shaped body was removed from the mold. After drying, the deposited thickness was measured. Results are shown in Table 2. Location Nos. 1-10 measured are shown in FIG. 14. For purposes of comparison, ceramic port liners having the same shape were obtained by a conventional drain casting, and their deposited thicknesses are also given in Table 2. As is evident from the below data, according to the present invention, the thickness can be made uniform up to the same or higher degree without necessitating the draining of the slurry as compared with the conventional technique. As shown in Table 3, the average deposited thickness $\bar{x}$ in the case of 200 g of the slurry being fed can be controlled accurately even when the same mold is repeatedly used for shaping, and results with very high reproducibility could be obtained.

TABLE 2

| Measured location | ① | ② | ③ | ④ | ⑤ | ⑥ | ⑦ | ⑧ | ⑨ | ⑩ | R | $\bar{x}$ |
|---|---|---|---|---|---|---|---|---|---|---|---|---|
| Present invention | 2.27 | 2.36 | 2.47 | 2.33 | 2.20 | 2.65 | 2.48 | 2.44 | 2.56 | 2.65 | 0.45 | 2.44 |
| Conventional process (Comparison) | 3.05 | 2.81 | 3.15 | 3.24 | 3.09 | 2.85 | 3.35 | 3.15 | 3.20 | 3.12 | 0.54 | 3.10 |

TABLE 3

| | No. | | | | |
|---|---|---|---|---|---|
| | 1 | 2 | 3 | 4 | 5 |
| Average deposited thickness (mm) | 2.44 | 2.50 | 2.48 | 2.46 | 2.43 |

As is clear from the aforegoing explanation, according to the present invention, all the slurry fed in a given amount is deposited while being rotated or swung together with the mold. Thus, the invention has advantages that ceramic articles having complicated shapes, such as ceramic port liners or ceramic manifolds, can be shaped by slip casting with accuracy in thickness, and that such ceramic articles can be suitably mass-produced without being influenced by change in water absorbability due to differences in use history of the molds, mold temperatures, etc. Furthermore, even when the grain size of the raw material in the slurry is large, the raw material has a great specific gravity, or when the viscosity of the slurry is low, deposition can be effected in a uniform thickness.

Furthermore, according to the present invention, the deposited thickness can freely be varied by adjusting the amount of the slurry. In addition, since the slurry need not be drained after the feeding of a given amount of the slurry, cast articles can always be stably obtained in desired deposited thicknesses without needing severe control of the timing of the drainage. Therefore, the present invention is advantageous for slip casting of hollow ceramic articles having complicated shapes, and greatly contributes to industrial developments.

What is claimed is:

1. A method of producing a hollow raw ceramic article, comprising the steps of:

pouring enough slurry, comprising water and ceramic raw material, into an opening of an hydrophilic mold to substantially fill such mold with said slurry;

inserting a device, for measuring a change in liquid surface level of said slurry, through said opening into said slurry;

measuring a liquid surface level of said slurry of said substantially filled mold using said liquid level measuring device;

absorbing an amount of water from said slurry through said mold to thereby deposit said ceramic raw material from said slurry onto an inner surface of said mold;

measuring a decrease in said liquid surface level, corresponding to said amount of said water absorbed from said slurry through said mold, using said liquid level measuring device;

draining excess slurry from said mold through said opening based upon a measured decrease of said liquid surface level which corresponds to deposition of a given thickness of said ceramic raw material from said slurry onto said inner surface of said mold, thereby forming said raw ceramic article; and 2. The method of claim 1, wherein said article is a ceramic port liner.

3. The method of claim 1, wherein said liquid level measuring device is a liquid level meter.

4. The method of claim 1, wherein said liquid level measuring device is a transparent pipe fitted to said opening.

5. A method of producing a tubular ceramic port liner, comprising the steps of:

pouring slurry comprising water and ceramic raw material into an opening of an hydrophilic mold;

absorbing water from said slurry through said mold to thereby deposit said ceramic raw material from said slurry onto an inner surface of said mold;

draining an amount of said slurry from said mold through said opening after a predetermined thickness of said ceramic raw material has deposited on said inner surface of said mold during said water absorption step;

covering said opening with an hydrophilic plate and inverting said mold;

depositing slurry remaining in said mold onto said plate to form a layer of said ceramic raw material thereon which closes said opening, thereby forming a raw ceramic port liner body;

removing said raw ceramic port liner body from said mold;

firing said raw ceramic port liner body; and opening opposite ends of said fired port liner body.

6. The method of claim 5, further comprising forming an air escape hole in each opposite end of said raw ceramic port liner body.

7. The method of claim 5, wherein said ceramic raw material is comprised of aluminum titanate.

8. The method of claim 5, wherein said opening is a valve hole.

* * * * *